United States Patent Office 3,263,270
Patented August 2, 1966

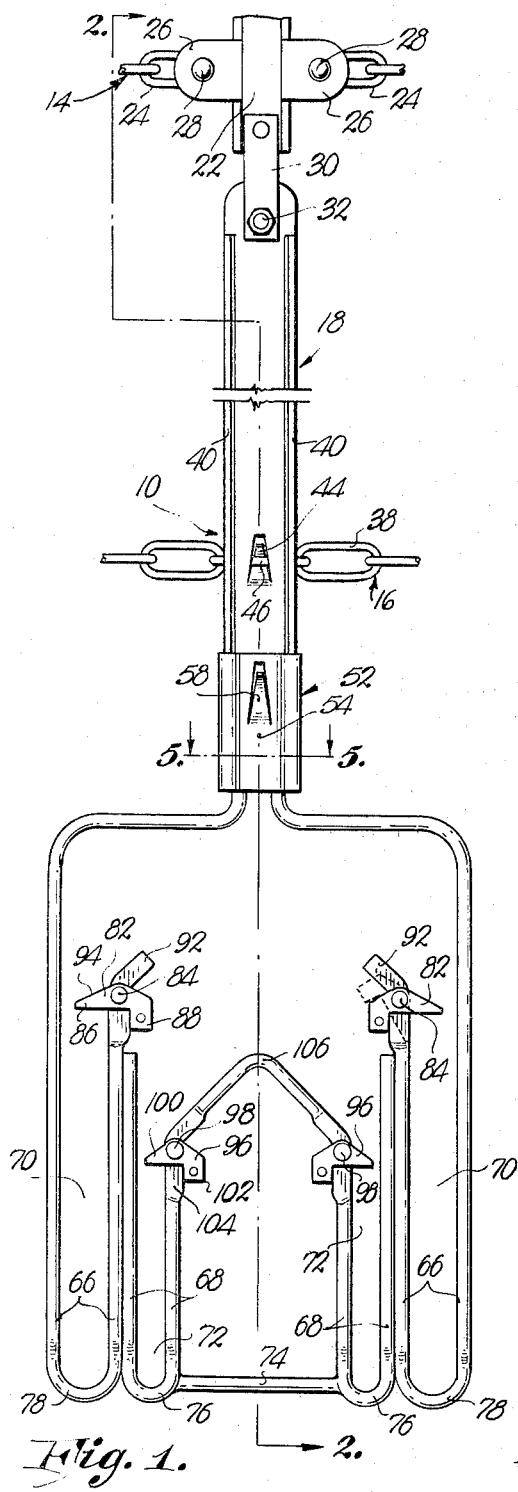

3,263,270
POULTRY SHACKLE
Robert D. Crawford, Kansas City, Mo., and James A. Bonuchi, Merriam, Kans., assignors to Gordon Johnson Company, Kansas City, Mo., a corporation of Missouri
Filed July 20, 1964, Ser. No. 383,589
5 Claims. (Cl. 17—44.1)

This invention relates to poultry conveyors and, more particularly, to a carrier of improved construction for retaining a bird in a predetermined disposition as the same is moved and subjected to defeathering operations.

Improved defeathering machines for poultry are provided with structure which apply slapping forces to different parts of a bird with the forces being exerted in different directions so that, as a result, the bird is caused to shift about and may even move out of the area at which the same is being defeathered.

Heretofore, birds have been carried by shackles suspended from an overhead conveyor by means of a flexible chain. As the birds passed through the picking area the flexibility of the chains permitted the shackles, and thereby the birds, to move upwardly and from side-to-side as the defeathering operation progressed. Not only do the machines become less effective for defeathering birds when this occurs, but parts of the birds may be damaged as a result of being thrown about and against adjacent supports as the birds leave the defeathering areas of the machines.

The present invention provides apparatus for retaining a bird in a predetermined disposition as the same passes through a defeathering machine so as to completely eliminate the upward and lateral movements of the bird as the same is subjected to defeathering operations. Thus, defeathering machines which apply slapping forces to various parts of the bird in different directions are rendered more effective than was heretofore possible inasmuch as the birds are retained in the defeathering areas of the machines at all times during the transit of the birds therethrough. In addition, damage to the birds is minimized for the reason that the birds are not violently thrown against stationary structures adjacent to but exteriorly of the defeathering areas of the machines.

It is, therefore, the primary object of the instant invention to provide apparatus for use with an overhead conveyor for carrying individual birds through a defeathering machine while restraining the bird against upward and lateral movements, whereby the bird is maintained in the defeathering area of the machine at all times during its transit therethrough and damage to the bird is minimized inasmuch as it can, at no time be thrown against stationary structure adjacent to but externally of the defeathering area of the machine.

Another object of the present invention is the provision of holding poultry-carrying apparatus of the type described which employs a shackle rigidly secured to the lower end of a rigid bar member, whereby a bird carried by the shackle is restrained against upward and lateral movements relative to the defeathering area through which it passes when the bar member is secured to the overhead conveyor and movable therewith.

A still further object of the present invention is the provision of apparatus of the aforesaid character which includes pivot structure intercoupling the bar member with the overhead conveyor so that the entire apparatus may move along an inclined path without having to shift the entire apparatus with respect to the vertical. As a result, a bird carried by the apparatus will, at all times, be suspended vertically so that the weight of the bird will not cause damaging stresses at any point on the apparatus itself.

A yet further object of this invention is the provision of apparatus of the type described which permits the immediate separation of the shackle from the bar member, whereby shackles of different sizes and types may be utilized with the structure of the present invention without requiring a considerable expenditure of time and effort on the part of the user thereof.

Yet another object of this invention is the provision of a poultry shackle of improved construction which utilizes gate-like projections in at least partially blocking relationship to the leg-receiving notches of the shackle with the projections being movable downwardly as the legs are inserted into the notches, but restrained against upward movement, whereby the legs, once they are placed in the notches, are prevented from moving out of the same inasmuch as the projections present gates to limit the upward movement of the legs of the bird and thereby prevent the removal of the legs from the notches.

In the drawing:

FIGURE 1 is a side elevational view of the apparatus for advancing a bird by means of an overhead conveyor and for restraining a bird against upward and lateral movement;

FIG. 2 is a cross-sectional view taken along line 2—2 of FIG. 1;

FIG. 3 is an enlarged, fragmentary, side elevational view of the gate-like projections on the shackle forming a part of the apparatus to limit upward movement of a leg in the notch of the shackle;

FIG. 4 is a fragmentary, cross-sectional view similar to FIG. 2 but illustrating the releasable means on the apparatus for separating the shackle from the rigid bar member coupled to the overhead conveyor; and FIG. 5 is a cross-sectional view taken along line 5—5 of FIG. 1.

Poultry conveyor apparatus 10 is to be used with an overhead conveyor 12 having a pair of vertically spaced, shifting mechanisms 14 and 16. Apparatus 10 includes a rigid bar member 18 interconnecting conveyor 12 with a poultry shackle 20 therebelow. Apparatus 10 is adapted for suspending a bird from conveyor 12 and moving the bird through a defeathering machine while restricting the bird against upward and lateral movement with respect to the machine.

Conveyor 12 is conventional in character and utilizes a yoke assembly 22 movable on an elongated track (not shown) by means of a prime mover adjacent to one end of the track. Mechanism 14 includes a series of link chains 24, each chain 24 spanning the distance between a pair of adjacent yoke assemblies 22, it being clear that apparatus 10 is used in conjunction with other, substantially identical apparatuses 10 for moving a number of birds successively through a defeathering machine. Each assembly 22 has a pair of opposed ears 26 which, by means of pins 28, intercouple the proximal ends in the adjacent chains 24.

A pair of straps 30 is rigidly secured to each assembly 22 respectively, straps 30 being dependent therefrom and provided with pivot structure 32 at their lower ends for pivotally mounting the upper end or bar member 18. Thus, member 18 is permitted to pivot about structure 32 in a vertical plane while at the same time, straps 30 restrict lateral movement of bar member 18 with respect to assembly 22 thereabove because the upper end 34 of bar member 18 is in sliding engagement with the upright, parallel, inner faces 36 of straps 30.

Mechanism 16 includes a single length of link chain 38, chains 24 and 38 being movable in the same direction and substantially at the same speed with respect to each other.

Each bar member 18 is rigid throughout its length and is substantially U-shaped in transverse cross section as shown in FIG. 5, to form a pair of spaced, generally parallel flanges 40 integral with the longitudinally extending base portion 42 thereof. Member 18 is stamped to provide a hook-like projection 44 therefor intermediate the ends thereof for receiving a link 46 of chain 38. Thus, chain 38 is releasably coupled to member 18. Link 46 preferably frictionally engages the adjacent side of base portion 42 when link 46 is disposed about projection 44. Thus, a certain amount of upward force is required to separate link 46 from member 18.

A pin 48 projects laterally from the opposite side of base portion 42 and has a major portion disposed between flanges 40 as shown in FIG. 5. Pin 48 is adjacent to the lower end of bar member 18 and provides a support for the vertically disposed loop 50 at the upper extremity of shackle 20.

A tubular retainer 52 is slidably disposed on member 18 for movement into and out of a position surrounding loop 50 when the latter is supported by pin 48. As shown in FIG. 5, retainer 52 is substantially C-shaped in transverse cross section to define a back 54 and a pair of transversely L-shaped sides 56. Sides 56, together with longitudinal edge portions of back 54 partially embrace flanges 40 as shown in FIG. 5 to maintain retainer 52 on bar member 18 and for preventing lateral movement of retainer 52 with respect thereto.

As shown in FIG. 2, retainer 52 is disposed about loop 50 when the latter is supported by pin 48. Retainer 52 is maintained in the position of FIG. 2 by a spring clip 58 which extends inwardly from back 54 and is removably disposed within a hole or recess 60 in base portion 42. Clip 58 has a convex face 62 which extends into recess 60 so as to facilitate the upward movement of retainer 52 with respect to pin 48. As shown in FIG. 4, retainer 52 is above pin 48 and in a position clearing loop 50 so that shackle 20 may be removed from supporting engagement by pin 48. Note that face 62 is in engagement with the proximal side of base portion 42 when retainer 52 is in the position of FIG. 4.

Shackle 20 includes a frame 64 having a pair of outer legs 66 at each side thereof respectively, and a pair of inner legs 68 for each pair of outer legs 66 respectively. Each pair of legs 66 defines an appendage-receiving notch 70, and each pair of legs 68 defines an appendage-receiving notch 72. Notches 70 are used when a bird is of large size such as a turkey or the like; whereas notches 72 are used for smaller birds such as chickens or the like. The innermost leg 66 of each pair of outer legs 66 is rigid to and in juxtaposition with the outer leg 68 of the corresponding pair of inner legs 68 as shown in FIG. 1. A bar 74 is rigid to and spans the distance between the bights 76 of the corresponding pairs of inner legs 68 to provide rigidity for shackle 20. Bights 76 close the bottom ends of notches 72 and bights 78 close the lower ends of notches 70. Bights 76 and 78 extend downwardly and to the side of the major plane of shackle 20 to permit the legs of a bird suspended by the shackle to hang substantially vertically at all times.

The innermost leg 66 of each pair of outer legs 66 is provided with a flat surface 80 thereon adjacent to the upper end thereof, and a gate-like projection or lever 82 is pivotally mounted intermediate its ends thereof on surface 80 by a pin 84. One end 86 of lever 82 normally extends at least partially across the corresponding notch 70; whereas, the opposite end 88 extends downwardly from a location spaced from pin 84 when end 86 blocks or extends transversely across notch 70.

A weight 90 is carried by end 88 of lever 82 to bias end 86 to the full-line position thereof shown in FIGS. 1 and 3. In this full-line position, weight 90 engages the edge of the adjacent leg 66 to prevent any further upward movement of end 86. An inclined extension 92 integral with the upper end of the corresponding leg 66 is disposed in the path of swinging movement of weight 90 and limits the movement of the latter to a predetermined arc as shown in FIG. 3. Weight 90 thus engages extension 92 when end 86 extends downwardly along the proximal leg 66. Weight 90 thus biases end 86 to the position thereof blocking the corresponding notch 70 so that an appendage, such as the leg of a bird, carried in the notch, will be prevented from moving upwardly and out of the notch at all times. Each lever 82 has an inclined upper edge 94 to facilitate the placement of an appendage in the corresponding notch 70.

A lever 96 similar in all respects to lever 82 but slightly smaller in size, is provided for each notch 72 respectively. Levers 96 are pivoted to corresponding legs 68 by pins 98 so that ends 100 of levers 96 extend at least partially across and block the upper ends of corresponding notches 72. Each lever 96 has a weight 99, similar in all respects to weight 90, on its opposite end 102 so that ends 100 will be biased to the full-line position thereof as shown in FIG. 1. It is to be noted that the proximal legs 68 corresponding to levers 96, are provided with flat surfaces 104 with respect to which levers 96 are swingable. The weights of levers 96 are limited in upward swinging movement by means of an inverted V-shaped extension 106 integral with and spanning the distance between the upper ends of the corresponding legs 68.

In operation, bar member 18 is pivotally secured by structure 32 to straps 30 and thereby assembly 22 for movement with the latter in a predetermined direction. Chain 38 is coupled to projection 44 so that a series of bar members 18, carried by respective assemblies 22 and coupled to chains 24 and 38, will move successively past a given point at the same speed.

Shackle 20, prior to the operation of conveyor 12, is coupled with bar member 18 by raising retainer 52 and placing loop 50 over pin 48. Retainer 52 is then allowed to slide downwardly until clip 58 is in recess 60. Shackle 20 is thus interconnected to bar member 18 and is rigidly interconnected to bar member 18 and prevented from any substantial fore and aft movement with respect to bar member 18 inasmuch as the maximum width of loop 50 is substantially equal to the minimum distance between flanges 40 as shown in FIG. 5.

The legs of a bird to be suspended from shackle 20 may then be placed in one of the pairs of notches 70 or 72, depending upon the size of the bird. To place the legs in notches 70 for instance, the legs are initially positioned above levers 82 and then moved downwardly into notches 70. Ends 86 move downwardly so that levers 82 clear the upper ends of notches 70, whereby the legs are permitted to move to the bottom of the notches adjacent to bights 78. The legs of a bird may be inserted in corresponding notches regardless of whether apparatus 10 is stationary or is moving under the influence of conveyor 12. In all cases, weights 90 return ends 86 to the full-line positions thereof shown in FIG. 1. The legs of a bird are thus prevented from moving out of the notches 70 after the legs have been inserted therein. Apparatus 10 is then ready for movement through a defeathering machine and the bird will be prevented from moving upwardly or to the side by virtue of the rigidity of bar 18 and shackle 20 and by virtue of the way in which bar member 18 is coupled to straps 30. Following the defeathering operation, different steps may be taken to remove the legs from notches 70, such considerations forming no part of the instant invention.

To remove shackle 20 and replace the same with another shackle, retainer 52 is moved from the position of FIG. 2 thereof to the position of FIG. 4 so that retainer 52 will clear loop 50 and permit the removal of the latter from pin 48. After replacing the shackle with another shackle, retainer 52 is again moved downwardly into surrounding relationship to loop 50 and until clip 58 is positioned in recess 60.

Pivot structure 32 effectively permits conveyor 12 to move along an inclined path, while at the same time, bar member 18 is maintained vertically disposed regardless of the inclination of the path of movement of conveyor 12. Chain 38 effectively interconnects adjacent bar members 18 to prevent any substantial swinging of one with respect to the other about corresponding pivot structures 32.

Having thus described the invention, what is claimed as new and desired to be secured by Letters Patent is:

1. In a poultry conveyor having a pair of vertically spaced shifting mechanisms movable substantially in the same direction and at the same speed, the combination with said mechanisms of means for coupling a bird by an appendage thereof to said mechanisms for movement therewith and for limiting the movement of the bird laterally and upwardly with respect to said mechanisms, said means comprising:

an elongated, rigid member;
means securing the member adjacent one end thereof to one of said mechanisms and holding the member against movement laterally of the direction of movement of said mechanisms;
means coupling said member adjacent the opposite end thereof to the other of said mechanisms;
a rigid element having a pair of legs defining an appendage-receiving notch;
means releasably connecting said element to the lower end of said member to hold the element against movement relative to the member laterally and longitudinally of the path of travel thereof with said legs extending downwardly from said member; and
a projection carried by one of said legs and extending partially across said notch to restrict the upward movement of an appendage in said notch.

2. In a poultry conveyor as set forth in claim 1, wherein said projection includes a lever, and wherein is included means swingably mounting the lever intermediate the ends thereof to said one leg for movement of one of said ends into and out of a position in at least partially blocking relationship to said notch, and a weight carried by the other end of the lever and engageable with said one leg for limiting the upward swinging movement of said one end of the lever.

3. In a poultry conveyor having a pair of vertically spaced shifting mechanisms movable substantially in the same direction and at the same speed, the combination with said mechanisms of means for coupling a bird by an appendage thereof to said mechanisms for movement therewith and for limiting the movement of the bird laterally and upwardly with respect to said mechanisms, said means comprising:

an elongated, rigid member provided with a laterally extending support;
means securing the member adjacent one end thereof to one of said mechanisms and holding the member against movement laterally of the direction of movement of said mechanisms;
means coupling said member adjacent the opposite end thereof to the other of said mechanisms;
a rigid element having a pair of legs defining an appendage-receiving notch and a portion removably disposed on said support;
means for releasably maintaining said portion on said support as said member moves under the influence of said mechanisms;
means rigidly securing said element to the lower end of said member with said legs extending downwardly from said member; and
a projection carried by one of said legs and extending partially across said notch to restrict the upward movement of an appendage in said notch.

4. In a poultry conveyor as set forth in claim 3, wherein said support includes a pin, said portion including an arcuate extension defining a loop and means securing said extension to one of said legs, said loop being disposed over said pin, said maintaining means including a retainer shiftably carried on said member and movable to a location about said loop when the latter is disposed over said pin.

5. In a poultry conveyor as set forth in claim 4, wherein said member is provided with a recess therein, said retainer having a spring clip removably disposed in said recess when said retainer is at said location.

References Cited by the Examiner

UNITED STATES PATENTS

| | | | |
|---|---|---|---|
| 1,234,781 | 7/1917 | Lozier. | |
| 2,393,072 | 1/1946 | Skinner | 24—223 |
| 2,614,287 | 10/1952 | Crane | 17—44.1 |
| 2,976,983 | 3/1961 | Zebarth. | |
| 3,103,696 | 9/1963 | De Long | 17—44.1 |
| 3,132,373 | 5/1964 | Altenpohl | 17—44.1 |
| 3,152,360 | 10/1964 | Fox et al. | 17—44.1 |
| 3,156,947 | 11/1964 | Birchmier et al. | 17—44.1 |

SAMUEL KOREN, *Primary Examiner.*

LUCIE H. LAUDENSLAGER, *Examiner.*

H. P. DEELEY, *Assistant Examiner.*